United States Patent
Khan

(10) Patent No.: US 10,443,725 B2
(45) Date of Patent: Oct. 15, 2019

(54) SHIFT-BY-WIRE MODULE ILLUMINATION STRATEGY FOR VEHICLE

(71) Applicant: Ford Global Technologies, LLC, Dearborn, MI (US)

(72) Inventor: Rahat H. Khan, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 590 days.

(21) Appl. No.: 15/254,093

(22) Filed: Sep. 1, 2016

(65) Prior Publication Data

US 2018/0058579 A1 Mar. 1, 2018

(51) Int. Cl.
| | |
|---|---|
| *F16H 63/42* | (2006.01) |
| *B60K 20/02* | (2006.01) |
| *F16H 59/12* | (2006.01) |
| *F16H 59/08* | (2006.01) |
| *F16H 59/02* | (2006.01) |

(52) U.S. Cl.
CPC ............. *F16H 63/42* (2013.01); *B60K 20/02* (2013.01); *F16H 59/08* (2013.01); *F16H 59/12* (2013.01); *F16H 2059/0221* (2013.01); *F16H 2059/081* (2013.01); *F16H 2059/085* (2013.01); *F16H 2063/423* (2013.01)

(58) Field of Classification Search
CPC .......... F16H 63/42; F16H 59/08; F16H 59/12; F16H 2059/081; F16H 2063/423; B60K 20/02

See application file for complete search history.

(56) References Cited

U.S. PATENT DOCUMENTS

| | | | |
|---|---|---|---|
| 5,245,313 A | 9/1993 | Polityka | |
| 6,367,940 B1 | 4/2002 | Parker et al. | |
| 7,571,662 B2 * | 8/2009 | Pickering | B60K 37/06 200/61.88 |
| 8,326,501 B2 * | 12/2012 | Hustyi | F16H 59/02 701/36 |
| 8,688,339 B2 * | 4/2014 | Fyie | F16H 59/08 477/34 |
| 2006/0146553 A1 * | 7/2006 | Zeng | B60Q 11/002 362/488 |
| 2009/0091313 A1 | 4/2009 | Teeters et al. | |
| 2011/0301818 A1 * | 12/2011 | Hamade | B60K 37/06 701/51 |
| 2012/0001747 A1 * | 1/2012 | Klatt | F16H 59/12 340/456 |
| 2018/0223988 A1 * | 8/2018 | Preisig | F16H 59/08 |

* cited by examiner

*Primary Examiner* — Thomas C Diaz
(74) *Attorney, Agent, or Firm* — David Kelley; Brooks Kushman P.C.

(57) ABSTRACT

A vehicle includes a shift by wire (SBW) module that allows for electronic shifting between various gears, such as park, neutral, drive, etc. The SBW module includes one or more buttons that enable the shifting between the various gears. When the park gear is selected, a light source illuminates a symbol or a portion of the button associated with placing the vehicle into park. A controller is programmed to darken or dim the light source in response to an operator pressing one of the buttons while the vehicle is in the park gear. For example, when the vehicle is already in park, another depression of the park button can darken or dim the light source associated with the park button.

20 Claims, 3 Drawing Sheets

SHIFT-BY-WIRE MODULE ILLUMINATION STRATEGY FOR VEHICLE

TECHNICAL FIELD

This disclosure generally relates to a control of a light source in a vehicle equipped with a shift by wire system. In particular, the control strategy includes utilizing the shift by wire module itself to control the light that corresponds to a selected drive mode (e.g., park, reverse, etc.).

BACKGROUND

Shifting a transmission into various modes (e.g., Park, Reverse, Neutral, and Drive) has been traditionally accomplished by mechanical links to put the vehicle in the drive modes via a lever mounted on the steering column or a gear shifter near the center console. More recently, vehicles have become equipped with shift by wire (SBW) systems in which the transmission modes are engaged/changed via electronic controls without any mechanical linkage between the gear shifting lever and the transmission. SBW systems eliminate space required for housing the mechanical linkages between the shifter and the transmission.

One type of SBW system includes a push-button panel in which multiple buttons are provided, each button corresponding to a desired transmission mode. For example, if the operator depresses a button corresponding to a Park mode (e.g., "P"), a request would be sent to the control system to place the vehicle in park. The request is fulfilled assuming other conditions are met, such as the vehicle being motionless and the brake pedal being applied. Another type of SBW system includes a rotary shifter in which the operator rotates a knob to the desired transmission mode.

SUMMARY

According to one embodiment, a vehicle includes a shift by wire (SBW) module that includes one or more buttons enabling an operator to shift a vehicle transmission into various gears, including a park gear. The vehicle also includes a light source for illuminating a symbol that indicates the park gear has been selected. The vehicle also includes a controller programmed to darken the light source in response to an operator pressing one of the buttons and the vehicle being in the park gear.

The darkening of the light source may only be possible if a brake pedal of the vehicle is not depressed.

The SBW module may be a push-button panel with buttons that each selectively enable a respective gear to be selected by the operator. One of the buttons may be a "P" for selecting the park gear. The light source for illuminating the "P" or the button associated with the park gear may be inside the SBW module.

The light source may be a single light source for all buttons, or each button may be provided with a respective individual light source.

In another embodiment, a vehicle includes a shift by wire (SBW) module having a button configured to, when selected, shift a transmission into a park mode. The vehicle also includes a light source for illuminating at least a portion of the button. At least one controller is programmed to darken the light source in response to the button being selected while the vehicle is in park.

In another embodiment, a method of controlling illumination on a shift by wire (SBW) module in a vehicle is provided. The method includes shifting a transmission of the vehicle into a park mode and illuminating a park indicator light on the SBW module in response to a first request from an operator via the SBW module. The method also includes darkening the park indicator light in response to a second request from the operator via the SBW module and the vehicle remaining in park.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Shift by wire (SBW) systems enable an operator or driver of a vehicle to engage or change transmission modes via electronic controls. Some examples of SBW systems include a push-button panel, a rotary shifter, and others. When the driver selects a particular transmission mode or gear (e.g., Park, Reverse, Neutral, Drive, Sport, etc.), a light source may illuminate an indicator to inform the driver that the particular transmission mode has been entered. For example, when the driver presses a button on the push-button panel or turns the rotary shifter to place the vehicle in Park, a light source within the console or module may illuminate the letter "P." This provides the driver with the assurance that the vehicle has been placed in park. However, illumination may not always be desirable. For example, there may be times that police and other governmental vehicles desire as much darkness as possible within the vehicle (e.g., during surveillance of an area). While darkness may be desired within the cabin, safety concerns may demand for the selected gear to be illuminated or otherwise displayed to the driver to properly inform the driver as to what gear is selected.

According to various embodiments of this disclosure, a system is provided that allows for the selective dimming or darkening of the illumination of the selected gear. The dimming or darkening can be done on the SBW module or display itself. Selective dimming or darkening of the light source that illuminates a display of the selected gear provides police or governmental vehicles with the ability to further dim or darken the interior of the vehicle when desired.

Figure 1:
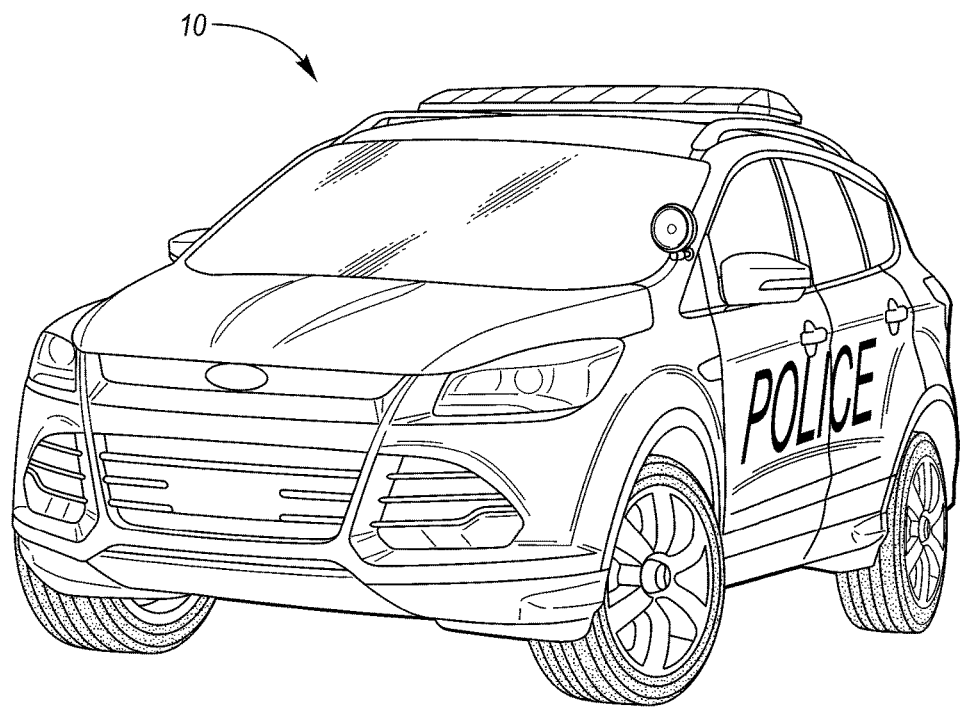
FIG. 1 is a perspective view of a vehicle equipped with a shift by wire (SBW) module, according to one embodiment.

FIG. 1 is one example of a vehicle 10 (e.g., police vehicle) that is equipped with the system further described below.

Figure 2A:
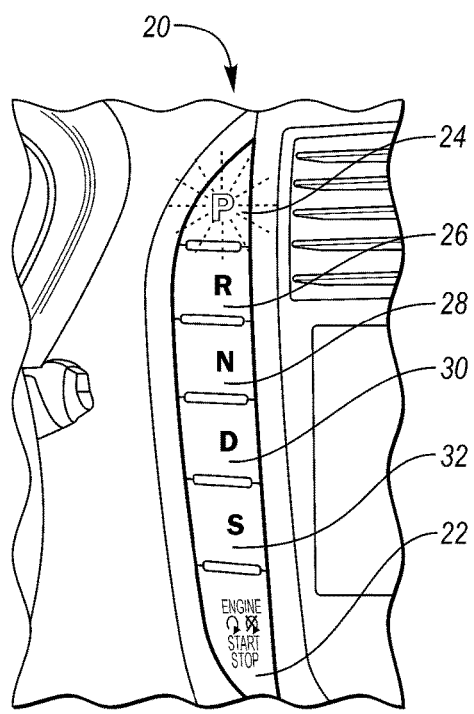
FIG. 2A is a front view of a SBW module having a push-button shift panel with the letter "P" illuminated by a light source, indicating that the vehicle is in park, according to one embodiment.

FIG. 2A is one example of a SBW module; in this particular example, the SBW module is a push-button shift panel 20. The push-button shift panel 20 is located adjacent to or incorporates an engine start/stop button 22 that enables the driver to stop and start the engine (or other power source, if the vehicle 10 is a hybrid vehicle, electric vehicle, or is powered by fuel cell, or the like). The push-button shift panel 20 includes a plurality of depressible buttons for shifting the drive mode of the vehicle. The term "drive mode" should be understood to mean a transmission mode or the like that alters the state of the transmission and powertrain from park, reverse, neutral, drive, and other optional modes. Such drive modes are commonly referred to as the PRND or PRNDL, acronyms referring to the park/reverse/neutral/drive/low modes.

A park button 24 ("P") enables the vehicle or transmission to be placed in park. A reverse button 26 ("R") enables the vehicle or transmission to be placed in reverse. A neutral button 28 ("N") enables the vehicle or transmission to be placed in neutral. A drive button 30 ("D") enables the vehicle or transmission to be placed in drive. A sport button 32 ("S") enables the vehicle or transmission to be placed in a sport mode.

The push-button shift panel 20 may also include a light source behind the buttons or within the console of the vehicle 10. The light source can include one or more light-emitting diodes (LEDs), for example. The light source is configured to illuminate a portion of each button to indicate that that particular drive mode is engaged. For example, as shown in FIG. 2A, when the park button 24 has been depressed and the vehicle or transmission is placed in park, the letter "P" on the park button 24 is illuminated. This informs the driver that the vehicle or transmission is placed in park. As the driver changes to other drive modes, the park button 24 can be darkened and the letter on that particular button associated with the newly-selected drive mode can be illuminated.

It should be understood that the push-button shift panel 20 may be incorporated into or part of an electronic display with a user interface on a screen, such as liquid-crystal display. In such an embodiment, the light source for the liquid-crystal display may be the light source for the selected gear.

Figure 2B:
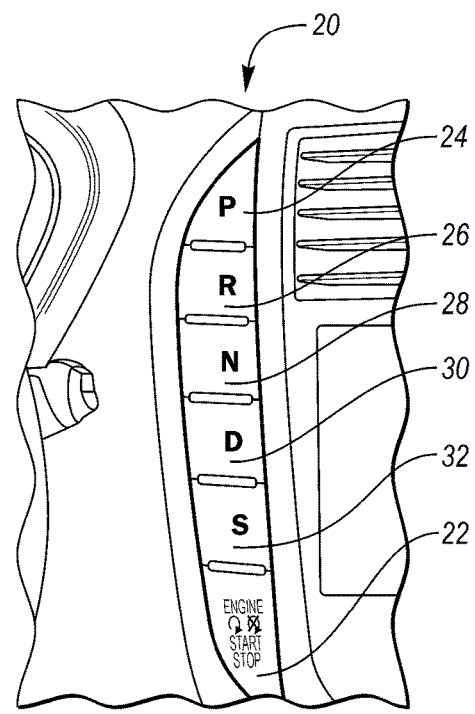
FIG. 2B is a front view of the SBW module of FIG. 2A, with the letter "P" not illuminated.
Figure 4:
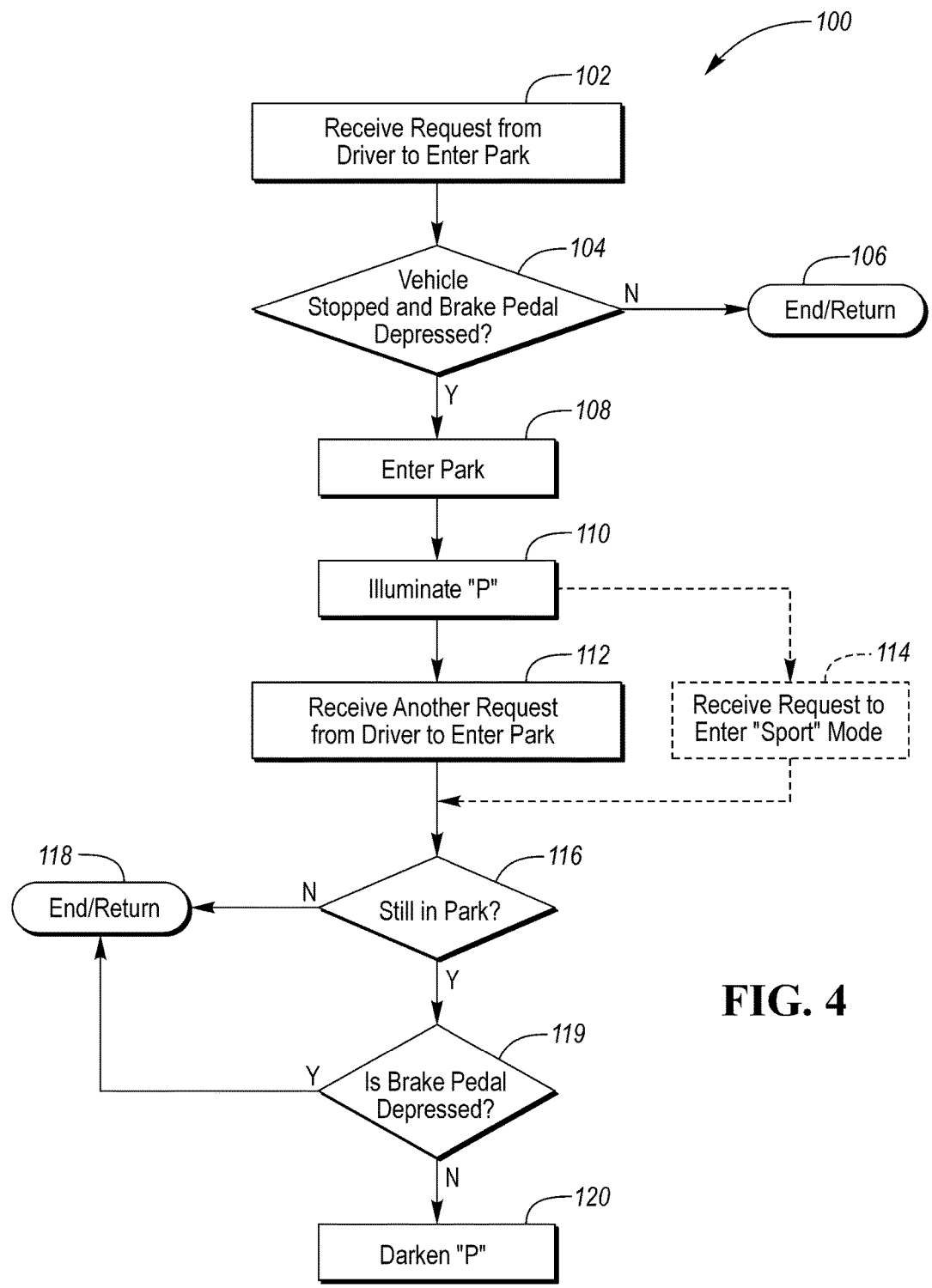
FIG. 4 is a flowchart of an algorithm implemented by a processor for controlling the light source of the SBW module, according to one embodiment.

FIG. 2B shows the push-button shift panel 20 with the park button dimmed or darkened, no longer illuminated as it was in FIG. 2A. A control system for performing this function is illustrated in FIG. 4 and described in more detail below. As will be described, the driver of the vehicle can press a button (e.g., the park button 24) when the vehicle is already in park, which commands the light associated with the park button 24 to be dimmed or darkened.

Figure 3A:
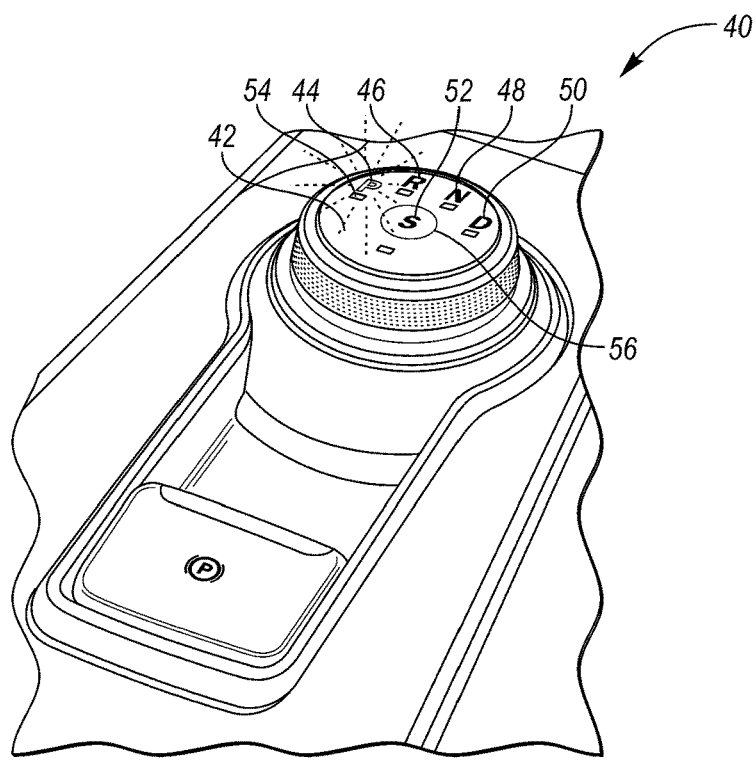
FIG. 3A is perspective view of a SBW module having a rotary shifter with the letter "P" illuminated by a light source, indicating that the vehicle is in park, according to one embodiment.

FIG. 3A is another example of a SBW module; in this particular example, the SBW module is a rotary shifter 40.

The rotary shifter 40 includes a knob 42 that is rotatably connected to a region of the vehicle, such as the center console. The knob 42 enables the driver to selectively transition into one of several drive modes by turning the knob 42. When the knob 42 is turned, one of the letters representing the selected drive mode is illuminated. For example, the letters P (at 44), R (at 46), N (at 48) and D (at 50) are provided, along with S (at 52) for sports mode. As is the case with FIGS. 2A-2B, the sports mode can be replaced with a letter L (for low), O (for overdrive), or some other drive mode. A corresponding window or region 54 is provided at each letter, in which that window or region 54 is illuminated as the respective drive mode is selected.

In one embodiment, a depressible button 56 is provided on the rotary shifter 40. In the embodiment shown in FIGS. 3A-3B, the button is in a central region of the rotary shifter 40, in a region associated with the sports mode at 52. This button 56 can be utilized by the driver for entering the sports mode, as opposed to requiring rotation of the rotary shifter 40 to enter the sports mode. During use, the button 56 can be depressed while the vehicle is already in drive in order to transition the vehicle or transmission into the sports mode. In another use, the button 56 can be depressed while the vehicle is already in neutral in order to hold the vehicle in neutral (such as, for example, when the vehicle goes through a car wash).

Figure 3B:
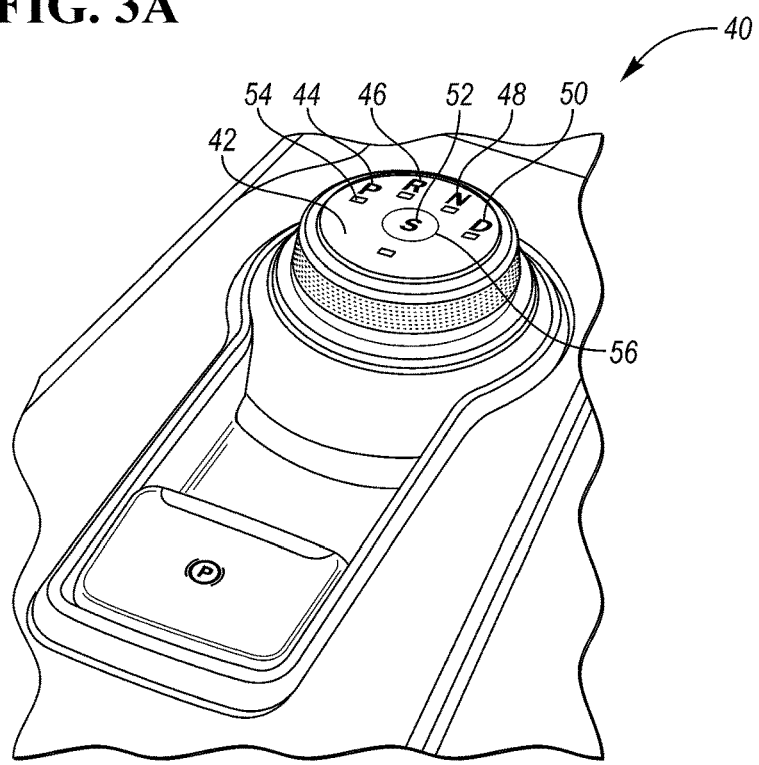
FIG. 3B is a perspective view of the SBW module of FIG. 3A, with the letter "P" not illuminated.

According to this disclosure, the button 56 can now be utilized to dim or darken the light source associated with the letter P when the vehicle is in park. FIG. 3B shows the rotary shifter 40 with the light source dimmed or darkened, while the vehicle is still on and remaining in park.

FIG. 4 is an example of an algorithm 100 implemented by a processor within the vehicle that is configured to control the light source associated with the SBW module. The processor can be part of or communicatively coupled to a transmission control module (TCM), a vehicle system controller (VCS), or a powertrain control unit (PCM), and as such, the processor of this disclosure can be referred to as a "controller". At 102, the controller receives a request from the driver to enter the park gear. At 104, the controller determines whether the vehicle is stopped and the brake pedal is depressed. This assures that it is safe to enter the park gear. Other conditions can be required to enter the park gear, such as the accelerator pedal being undepressed, the engine speed being below a threshold, or other conditions. If conditions dictate that the vehicle cannot enter the park gear, the algorithm ends or returns at 106.

If conditions dictate that it is safe to enter the park mode, the transmission or vehicle enters park at 108. At or about the same time as entering the park mode, the letter "P" or some other indicator on the SBW module is illuminated at 110. The illumination can be as shown in FIG. 2A or 3A, for example.

Once the vehicle is in park, another request is received by the controller. In an embodiment in which the SBW module is a push-button shift panel or the like, a request is received from the driver to enter the park mode again at 112. This can be accomplished by, for example, receiving a signal indicating that the park button was depressed again, while the vehicle remains in park. In another embodiment in which the SBW module is a rotary shifter or the like, such as illustrated in FIG. 3B, a request is received form the driver to enter the sport mode at 114. This can be accomplished by, for example, receiving a signal indicating that the button on the rotary shifter was depressed while the vehicle remains in park. Of course, the button on the rotary shifter can be for entering another drive mode, such as low, overdrive, or manual (if the vehicle is equipped with an e-shifter).

Once a request is received by the controller at either 112 or 114, the controller determines whether the vehicle is still in park at 116. If the vehicle is not in park, the algorithm ends or returns at 118. If the vehicle is in park when the request is received, then the controller proceeds to 119 in which the controller determines whether the brake pedal is depressed. If the brake pedal is depressed, the algorithm ends or returns at 118. If the brake pedal is not depressed, the algorithm proceeds to 120 in which the controller commands the light source to dim or darken at 120. Enabling the light source to dim or darken only if the brake pedal is not depressed allows the dimming or darkening of the light source to occur without disturbing any existing feature or safety issue in the vehicle. Brake pedal depression can be determined from an associated brake pedal depression sensor coupled to the brake pedal and to the controller. The brake pedal depression sensor sends a signal to the controller in response to the brake pedal being depressed. Such a signal can be operative to perform other functions such as turning on the brake lights.

The controller can then later command the light source to illuminate once again in response to the vehicle exiting park gear, another gear being selected, another request being received at 112, 114, the brake pedal being depressed, etc.

The words "dim" and "darken" are used above to describe the visual appearance of the light source when an affirmative decision is made by the controller at 116. This is intended to mean that the light source can be reduced in its light output, or can change the color of the light, or can disable light output altogether. Furthermore, successive or repetitive requests received at 112, 114 can cause progressive dimming of the light source. The light source can be toggled as a plurality of requests at 112, 114 are received while the vehicle remains in park.

In one embodiment, an assurance that the vehicle is in park before performing the dimming or darkening of the light source is required. This can be for safety purposes, so that the dimming or darkening of the light source does not accidentally occur during vehicle movement (during which time darkening of the cabin may not be desired as often).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
   a shift by wire (SBW) module including one or more buttons and enabling an operator to shift a transmission into various gears including a park gear;
   a light source for illuminating a symbol indicating the park gear has been selected; and
   a controller programmed to darken the light source while the vehicle remains on in response to an operator pressing one of the buttons and the vehicle remaining in the park gear and on.

2. The vehicle of claim 1, wherein the SBW module includes a push-button shift panel, and the one or more buttons enable the operator to shift the transmission into the various gears.

3. The vehicle of claim 2, wherein the one of the buttons is configured to shift the transmission into the park gear.

4. The vehicle of claim 1, wherein the SBW module includes a rotary shifter.

5. The vehicle of claim 4, wherein the one of the buttons is one for shifting into a sport mode.

6. The vehicle of claim 1, wherein the controller is further programmed to inhibit darkening of the light source in response to the operator pressing the one of the buttons and the vehicle not being in the park gear.

7. The vehicle of claim 1, wherein the controller is further programmed to, after the light source has been darkened, illuminate the light source in response to the operator pressing the one of the buttons and the vehicle being in the park gear.

8. The vehicle of claim 1, further comprising a brake pedal, wherein the controller is further programmed to inhibit the light source from darkening in response to the brake pedal being depressed.

9. A vehicle comprising:
   a shift by wire (SBW) module having a button configured to, when selected, shift a transmission into a park mode;
   a light source for illuminating at least a portion of the button; and
   a controller programmed to darken the light source while the vehicle remains on in response to the button being selected while the vehicle is in park and on.

10. The vehicle of claim 9, wherein the SBW module includes a push-button shift panel with a plurality of buttons, each button configured to shift the transmission into a respective drive mode.

11. The vehicle of claim 9, wherein the controller is further programmed to inhibit darkening of the light source in response to an operator pressing the button and the vehicle not being in park.

12. The vehicle of claim 9, wherein the controller is further programmed to, after the light source has been darkened, illuminate the light source in response to an operator pressing the button and the vehicle being in park.

13. A method of controlling illumination on a shift by wire (SBW) module in a vehicle, comprising:
   in response to a first request from an operator via the SBW module to shift gears, shifting a transmission of the vehicle into a park mode and illuminating a park indicator light on the SBW module; and
   in response to a second request from the operator via the SBW module to shift gears and the vehicle remaining in park and on, darkening the park indicator light while the vehicle is on.

14. The method of claim 13, wherein the park indicator light is a light source within the SBW module configured to illuminate a letter "P".

15. The method of claim 13, further comprising in response to a third request from the operator via the SBW module and the vehicle remaining in park, brightening the park indicator light.

16. The method of claim 13, wherein the second request is a request to shift the transmission into park.

17. The method of claim 13, wherein the first request and the second request both include depression of a button configured to request the transmission to shift into park.

18. The method of claim 13, wherein the SBW module includes a rotary shifter.

19. The method of claim 13, wherein the second request is a request to shift the transmission into a sports mode.

20. The method of claim 13, further comprising, while the park indicator light is darkened, illuminating another transmission mode indicator light in response to a third request from the operator to shift out of the park mode and into another transmission mode.

* * * * *